Patented Apr. 22, 1941

2,239,441

UNITED STATES PATENT OFFICE 2,239,441

ALDEHYDE REACTION PRODUCTS WITH NITROGEN-CONTAINING METHYLENE COMPOUNDS

Gaetano F. D'Alelio, Pittsfield, Mass., assignor to General Electric Company, a corporation of New York No Drawing. Application June 20, 1940, Serial No. 341,531

20 Claims. (Cl. 260—43)

This invention relates to new condensation products and is a continuation-in-part of my copending applications Serial No. 169,465, filed October 16, 1937, and Serial No. 330,555, filed April 19, 1940, both of which applications are assigned to the same assignee as the present invention.

This invention is based on the discovery that organic compounds having a methylene group attached to two adjacent carbon atoms, which are at least double-bonded and in turn are each attached to adjacent nitrogen atoms, constitute a class of substances which on reaction with aliphatic aldehydes, e. g., formaldehyde, form light-colored, light-stable resinous products. Examples of such organic compounds are malonic diamide, methylene cyanide, cyanoacetamide, etc. The grouping of this class of substances may be represented generally as (1) 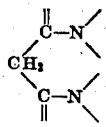

or (2) 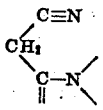

or (3) 

As will be noted from the above graphic formulas, the carbon atoms adjacent to the methylene group are at least double-bonded and may be attached either to a double-bonded element, e. g., oxygen, sulfur, selenium, etc., or to a divalent radical, e. g., an imine radical (=NH).

I am aware that the broad suggestion has been made heretofore that resinous compositions may be obtained by condensing formaldehyde or its polymers with polyamides of polycarboxylic acids, more particularly those containing more than four carbon atoms, e. g., polyamides of adipic acid, suberic acid, phthalic acid, etc. It also has been suggested that the properties of such resinous condensation products may be altered by adding before, during or after the condensation substances capable of reaction with formaldehyde, e. g., urea and its derivatives, phenols and aniline. However, to the best of my knowledge and belief, resinous compositions were not prepared prior to my invention by intercondensing an aliphatic aldehyde and an organic compound having the graphic formula

where X is a member of the class consisting of nitrile radicals, and amide and thioamide radicals having at least one hydrogen atom attached directly to the amide nitrogen, which compound hereafter for brevity is designated generally as "malonic compound." Likewise, to the best of my knowledge and belief, it was not known or appreciated prior to my invention that particularly useful, relatively inexpensive resins could be obtained by intercondensing ingredients comprising an aliphatic aldehyde, a malonic compound, and a different organic compound capable of forming a methylol derivative as an intermediate during the resin formation, e. g., a phenol; or, by intercondensing a malonic compound (or a partial condensation product, e. g., a methylol derivative, of a malonic compound and an aliphatic aldehyde, e. g., formaldehyde) with a partial condensation product, e. g., a methylol derivative, of a phenol or a urea (or other methylol-forming organic compound) and an aliphatic aldehyde.

The class of methylene-containing compounds under consideration have been found to react with aliphatic aldehydes, e. g., formaldehyde, in the presence of either alkaline or acid catalysts, or without the presence of a catalyst, to form colorless resins varying from vitreous and semi-vitreous products to fine powders all of which form plastic masses under heat, or under heat and pressure, and can be molded. In the cured state the resins are resistant to sunlight. They may be produced, therefore, in light colors including the pastel shades.

Any substance or catalyst which has an acid or an alkaline nature may be used to obtain the acid, alkaline or neutral condition under which the reactants are intercondensed. For example, I may use ammonia, calcium hydroxide, sodium and potassium hydroxides, carbonates and bicarbonates, ammonium carbonate, ammonium acetate, lithium carbonate, sodium cyanide, sodium tetraborate, potassium sodium tartrate, methyl amines such as trimethyl amine, diethyl amine, triisopropyl amine, ethanol amines, e. g., triethanol amine, triisopropanol amine, ethylene diamine, triethylene tetramine aniline, pyridine, morpholine, biguanidine, glycine, sodium glycinate, sodium acetate, etc.; also, inorganic and organic acids such as hydrochloric, sulfuric, phosphoric, acetic, acrylic, crotonic, malonic, etc., acid salts such as sodium acid sulfate, secondary ammonium phosphate, mono-sodium phosphate, mono-sodium phthalate, etc.

In producing the new condensation products of this invention, the reaction between the components may proceed under a wide variety of time, pressure and temperature conditions. The temperature of reaction may vary from room temperature to the reflux temperature of the reactants at reduced, atmospheric or superatmospheric pressure. Advantageously the reaction between the components may be initiated at a pH above 7.0 and completed at a pH below 7.0. The dehydration of the resin may be carried out at atmospheric pressures with the application of heat, e. g., at 50° to 100° C., or at lower temperatures by using vacuum.

The condensation reaction preferably is carried out in the presence of an alkaline catalyst, inasmuch as immediate reaction then takes place between the reactants. With an acid catalyst the time of reaction of the aliphatic aldehyde with the malonic compound is longer. On heat treatment the alkaline-catalyzed condensation products advance in softening point to a stage where they are not readily fusible, but are not in the cured state at this point. Usually the addition of an acid material such, for example, as acid potassium sulfate, acetic acid or even an acidic synthetic resin such as an acidic alkyd resin, or an acidic gum such as shellac, produces a thermosetting resin that may be cured to an insoluble, infusible state.

The products may be obtained with glass clarity if a light-colored acid is used in the cure. Fillers, dyes, pigments, etc., may be incorporated into the resinous mass and may be mixed with the resin either in the syrupy stage or in the dehydrated state. The alkaline syrup may be converted to the acid side and moldable sheets prepared by impregnating with it paper, cloth or other fibrous material. Translucent or opaque laminated materials thus may be made.

Because of the peculiar structure of the malonic compounds with which this invention is concerned, it is possible to utilize them in the conversion of fusible phenolic resins to the infusible state. It is to be observed that condensation products of such compounds and an aliphatic aldehyde have an ethylenic structure. Thus, when formaldehyde and malonic diamide are condensed, the following reaction occurs:

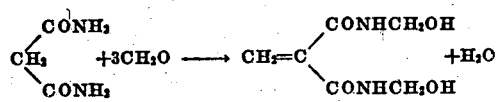

The product of the reaction is in itself not only polymerizable but acts as a catalyst in the conversion of phenol-aldehyde condensation products to the cured or infusible state. Moreover, the products so produced are light-colored and of good light-stability, a truly unexpected result in the case of phenol-aldehyde condensation products which, as heretofore prepared, have not been light-colored or, if so initially, have not been resistant to light.

In carrying one embodiment of my invention into effect I cause to react a mixture comprising (that is, ingredients comprising) an aliphatic aldehyde and at least one organic compound having the graphic structure

where X is a member of the class consisting of nitrile (—C≡N) radicals, and amide and thioamide radicals having at least one hydrogen atom attached directly to the amide nitrogen. Illustrative of such amide and thioamide radicals are those which may be represented by the formulas

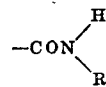

and

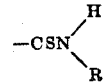

where R represents hydrogen, or alkyl, aryl, aralkyl, alkaryl, acyl, naphthyl, hydrocyclic, heterocyclic, etc., radicals, or nitro, halogeno, aceto, carbalkoxy, acetoxy, etc., derivatives of such radicals. Thus it is seen that R may be, for example, hydrogen or any hydrocarbon radical.

In effecting reaction between ingredients comprising the aliphatic aldehyde and the malonic compound, various mol ratios of reactants may be employed as desired or as conditions may require, but the proportions usually are within the range of ¾ to 6 or 7 mols aliphatic aldehyde for each mol of the malonic compound. Preferably I use approximately 1 to 4 mols aliphatic aldehyde per mol of the malonic compound. The resulting methylol or methylene derivatives then may be condensed with another methylol-forming organic compound, e. g., a urea, a phenol, etc., or with a partial condensation product, e. g., a methylol derivative, of a phenol (or other methylol-forming organic compound) and an aliphatic aldehyde. In preparing such partial condensation products of, say, a phenol and an aliphatic aldehyde, the mol ratios of reactants may be varied as desired or as conditions may require, but usually the proportions are within the range of ¾ to 6 or 7 mols of the aliphatic aldehyde for each mol of the phenolic body, for example from 1 to 4 mols of the former for each mol of the latter.

The ratio of the total molar amount of phenolic body (or other methylol-forming organic compound) and malonic compound to aliphatic aldehyde may vary considerably, depending upon the particular starting reactants, the conditions of reaction and the particular properties desired in the end-product, but generally is within the range of ¾ to 6 or 7 mols aliphatic aldehyde for each mol total phenolic body and malonic compound (that is, 1½ to 12 or 14 mols aliphatic aldehyde for each two mols of total phenolic body and malonic compound). Particularly good results are obtained with the use of 1½ to 2½ mols aliphatic aldehyde, specifically formaldehyde, for each mol of total phenol and malonic compound. Mainly for economic reasons I prefer to use not exceeding substantially one mol of the malonic compound for each mol of phenol (or equivalent material), and usually employ less than 0.8 mol, more particularly from about 0.05 to 0.7 mol of the former for each mol of the latter.

In producing the condensation products wherein at least three reactants are employed, I may intercondense the components under various conditions. For example, all the components may be mixed together and the reaction caused to proceed under acid, alkaline or neutral conditions. Or, I may effect partial condensation between an aliphatic aldehyde and a phenol (or other methylol-forming organic compound), then add the malonic compound and effect further condensation. Or, I may first partially condense the malonic compound with an aliphatic aldehyde under acid, alkaline or neutral conditions and then add, say, a phenol and effect further condensation. Or, I may separately partially condense (1) a phenol and an aliphatic aldehyde and (2) a malonic compound and an aliphatic aldehyde, thereafter mixing the two products of partial condensation and effecting further condensation therebetween. The reactants of (1) and of (2) initially may be condensed under acid, alkaline or neutral conditions. The above reactions may be carried out in the presence or absence of other substances as, for example, fillers, solvents or diluents, other natural and synthetic bodies, etc.

Depending upon the particular reactants employed and the particular conditions of reaction, the intermediate (potentially reactive) condensation products vary from clear, water-soluble liquids to milky dispersions. These liquid intermediate condensation products may be concentrated or diluted further by the removal or the addition of solvents to form liquid coating compositions of adjusted viscosity and concentration. These liquid compositions may be used, for instance, as surface coating materials, in producing laminated articles, etc. The liquid intermediate products may be used alone, or mixed with fillers, dyes, pigments, lubricants, etc., in the production of molding compositions. Also, these products may be dried and granulated to form clear, unfilled, heat-convertible resins.

In order that those skilled in the art better may understand how the present invention may be carried into effect, the following examples are given by way of illustration. All parts are by weight.

*Example 1*

Malonic diamide_____parts__ 25
Aqueous solution of formaldehyde (approximately 37.1% HCHO)_____parts__ 79.3
Sodium hydroxide in 5 parts water (calculated on the weight of malonic diamide used)_____per cent__ 0.25

The above components are mixed at room temperature and allowed to stand undisturbed for from 1 to 24 hours. The solution is then evaporated by the application of heat, at atmospheric or sub-atmospheric pressure, or is evaporated with the aid of vacuum alone.

The reaction may be carried out at higher temperature either by first bringing the malonic diamide and formaldehyde to reflux temperature and then slowly adding the catalyst, or by first mixing all of the ingredients and then raising the temperature.

The final resin is the same, regardless of the amount of formaldehyde used, provided at least 3 mols formaldehyde are present. That is, the product is tri-methylol malonic diamide, viz.:

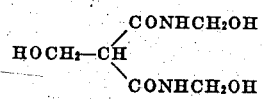

which probably dehydrates through different stages to tri-methylene malonic diamide by the loss of 3 mols of water:

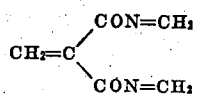

The resinous product obtained as above outlined may be used to convert a fusible phenolic resin to the infusible state, yielding light-colored resinous products. Thus:

A phenolic resin is prepared from redistilled phenol, formaldehyde and a sulfuric acid catalyst. After reaction has taken place between the ingredients for one hour, the water layer is decanted and the resin washed with water to remove as far as practical all traces of the acid. The product then is dehydrated under vacuum (27" mercury) at about 100° C. until it is brittle. A very light-colored, novolak-type resin results.

The following table shows the results of the preparation of several resinous products from the novolak-type resin prepared as outlined above, using a malonic diamide-formaldehyde reaction product prepared as also outlined above. The preparation of the following resinous products was effected by processing equal parts by weight of the malonic diamide-formaldehyde reaction product and the washed phenolic resin. The temperature of the malonic diamide-formaldehyde condensation reaction is given in each case, as is also the color of the product obtained when equal parts of the malonic diamide-formaldehyde reaction product and phenolic resin are molded at 150° C. for 5 to 10 minutes.

| No. | Percent NaOH (based on malonic diamide)* | Mol ratio malonic diamide to CH₂O | Temp. of reaction °C. | Reaction product with phenolic resin |
|---|---|---|---|---|
| 1 | 4 | 1:7 | 90 | Reddish pink, clear. |
| 2 | 3 | 1:7 | 90 | Do. |
| 3 | 2 | 1:7 | 90 | Light pink, clear. |
| 4 | 1 | 1:7 | 90 | Do. |
| 5 | None added | 1:7 | 90 | No real cure. |
| 6 | 4 | 1:7 | 50 | Reddish pink, clear. |
| 7 | 1 | 1:7 | 50 | Light yellow pink, clear. |
| 8 | 4 | 1:4 | 50 | Light yellow, opaque. |
| 9 | 1 | 1:4 | 50 | Light cream, opaque. |
| 10 | 4 | 1:4 | 90 | Slight pink cast, clear. |
| 11 | 1 | 1:4 | 90 | Light ivory, opaque. |
| 12 | 1 | 1:3.2 | 50 | Ivory. |
| 13 | 4 | 1:3.2 | 50 | Yellow, opaque. |
| 14 | 1 | 1:4 | Room temp. | Ivory, opaque. |
| 15 | 1 | 1:4 | 90 | Do. |

*NOTE.—The percentages of NaOH are in addition to the amount required to neutralize the formaldehyde solution.

*Example 2*

Parts
Malonic diamide_____ 25
Aqueous solution of formaldehyde (approximately 37% HCHO)_____ 139 are heated under reflux at boiling temperature for 12 hours with no added catalyst and then dehydrated under vacuum to a water-white, glassy resin that is soluble in water. This resin can be cured to the infusible state. The addition of acid hastens the cure.

*Example 3*

Parts
Malonic diamide_____ 25
Aqueous solution of formaldehyde (approximately 37% HCHO)_____ 139
Hydrochloric acid in 5 parts water_____ 1 are refluxed 20 hours and dehydrated to a glassy, water-white resin. This resin is soluble in water and can be cured to the infusible state without further addition of acid.

Example 4

This example illustrates the preparation of a resin wherein one of the reactants is cyanoacetamide,

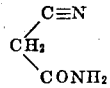

| | Parts |
|---|---|
| Cyanoacetamide | 15 |
| Aqueous solution of formaldehyde (approximately 37.1% HCHO) | 48 |
| Sodium hydroxide in 10 parts water | 0.2 | are mixed in the cold at about 30° C., the temperature rising to about 70° C. An orange-colored solution results. After standing one hour the product is evaporated in an oven at about 70° C. for 10 to 15 hours. The resin may be cured, and in the cured state is insoluble in water, while in the uncured state it is partly dissolved with difficulty in boiling water.

Example 5

This example illustrates the preparation of a resin wherein one of the reactants is N, N'-diphenyl malonic diamide,

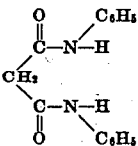

| | Parts |
|---|---|
| N, N'-diphenyl malonic diamide | 5 |
| Aqueous solution of formaldehyde (approximately 37.1% HCHO) | 7 |
| Sodium hydroxide in 20 parts water | 0.1 | are refluxed for 75 minutes. A creamy white, insoluble resin precipitates out and is filtered off from the water layer. The resin is dried at 70° C. It is insoluble in water and can be cured to an infusible, insoluble state. The addition of acid hastens the time of cure.

Example 6

This example illustrates the preparation of a resin wherein one of the reactants is methylene cyanide,

| | Parts |
|---|---|
| Methylene cyanide | 10 |
| Aqueous solution of formaldehyde (approximately 37.1% HCHO) | 40 |
| Sodium hydroxide in 10 parts water | 0.1 | are mixed at room temperature. The reaction starts immediately and the temperature rises to 70° C. The solution is dehydrated, for example by heating for 10 hours in a 70° C. oven. The resin is amber-colored and in the uncured state is difficultly soluble in hot water. The cured resin is insoluble and infusible.

Example 7

This example illustrates the preparation of a resin wherein one of the reactants is N, N'-dibutyl malonic diamide,

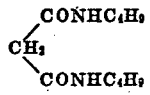

| | Parts |
|---|---|
| N, N'-dibutyl malonic diamide | 21.4 |
| Aqueous solution of formaldehyde (approximately 37.1% HCHO) | 24.3 |
| Sodium hydroxide in a small amount of water | 0.21 | are mixed and heated at boiling temperature under reflux for 1 hour. The reaction mass separates into two phases on standing. The entire mass is dehydrated by heating it in an open vessel on a 150° C. hot plate. A soft, sticky, colorless, thermoplastic resin results.

Example 8

This example illustrates the preparation of a resin wherein one of the reactants is N, N'-dicyclohexyl malonic diamide,

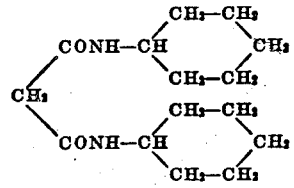

| | Parts |
|---|---|
| N, N'-dicyclohexyl malonic diamide | 13.3 |
| Aqueous solution of formaldehyde (approximately 37.1% HCHO) | 12.2 |
| Sodium hydroxide in a small amount of water | 0.13 | are mixed and heated at boiling temperature under reflux for 1 hour. The reaction mass separates into two phases on standing. The entire mass is dehydrated by heating it in an open vessel on a 150° C. hot plate. The dehydrated product is a soft, sticky, colorless, thermoplastic resin somewhat wax-like in character.

Example 9

This example illustrates the preparation of a resin wherein one of the reactants is N, N'-diethanol malonic diamide,

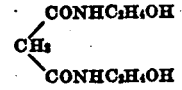

| | Parts |
|---|---|
| N, N'-diethanol malonic diamide | 19.0 |
| Aqueous solution of formaldehyde (approximately 37.1% HCHO) | 24.3 |
| Sodium hydroxide in a small amount of water | 0.19 | are mixed and heated under reflux for 1 hour, yielding a homogeneous mass. After dehydrating in an open vessel on a 150° C. hot plate, a soft, sticky, colorless thermoplastic resin is obtained.

Example 10

This example illustrates how the amides used in Examples 7, 8 and 9 may be intercondensed with a partial condensation product of phenol and formaldehyde and the resulting resin used in making molding compositions and molded articles.

A master batch of a phenol-formaldehyde resin syrup is made by reacting for 4 hours at 50° C.:

| | Parts |
|---|---|
| Redistilled synthetic phenol | 180 |
| Aqueous solution of formaldehyde (approximately 37.1% HCHO) | 390 |
| Anhydrous potassium carbonate in a small amount of water | 5.7 |

This yields a yellow syrup. Portions of this syrup (143 parts) are heated under reflux for 30 minutes with 4.5 parts each of the amides used in Examples 7, 8 and 9. Each of the resulting liquid resins is neutralized with 1.21 parts oxalic acid, yielding a white heterogeneous mass. This mass is mixed with 57 parts alpha flock having incorporated therewith 0.57 part zinc stearate. The resulting molding compositions are dried at 60° C. and then sheeted for approximately five minutes on differential rolls, one of which is hot and the other cold. The sheeted compounds are ground. Molded articles are made from each of the ground compounds by molding for 5 minutes under a pressure of 2000 pounds per square inch at about 150° C. The molded articles are well cured throughout and of light color.

*Example 11*

| | Parts |
|---|---|
| Malonic diamide | 102 |
| Acetaldehyde | 132 |
| Sodium hydroxide in 200 parts water | 3 |

The malonic diamide and acetaldehyde are added to the solution of sodium hydroxide with the evolution of considerable heat and foaming. The mixed components are heated under reflux for 1 hour, then in an oven at 100° C. for 4 hours. The resulting product is a somewhat soft, reddish brown resin which becomes harder upon heating for an additional 35 minutes at 100° C.

*Example 12*

| | Parts |
|---|---|
| Malonic diamide | 102 |
| Acrolein | 168 |
| Sodium hydroxide in 100 parts water | 1 |

The above components are heated under reflux for 2½ hours, yielding a resinous mass when cold. This mass is dehydrated by heating in an oven for about 17½ hours at 55° C., then for about 2 hours more at 100° C. The resulting product is a hard, yellow resin.

Almost all of the alkaline-catalyzed condensation products of a malonic compound of the kind with which this invention is concerned and an aliphatic aldehyde, e. g., formaldehyde, exhibit hardening or drying tendencies, but are actually cured by the addition of substances of an acid nature, e. g., organic acids, such as acetic, oxalic, citric, phthalic anhydride, salicylic acid and the like, or acidic salts such as sodium acid phosphate, copper sulfate or the like, or acidic resins, such as shellac or acidic synthetic resins, e. g., acidic alkyd-type resins. Resinous products prepared with the aid of acid catalysts usually cure without the necessity of any added substances.

The finally cured resins are light-stable and unaffected by most solvents. With fillers, such as wood flour and alpha flock and the application of heat and pressure, the resin may be molded into rigid pieces. The filler may be mixed with the dehydrated resin or with the reaction product in the syrupy stage.

As further illustrative of the scope of my invention, the following examples are given of the production of varnishes and laminated products from phenol-aldehyde resins in which the condensation products described herein are used as catalysts and co-condensing or co-polymerizing agents.

*Example 13*

| | Parts |
|---|---|
| Malonic diamide-formaldehyde partial condensation product | 5 |
| Re-distilled, water-white phenol | 50 |
| Aqueous formaldehyde solution (approximately 37.1% HCHO) | 125 |
| Sodium hydroxide in 5 parts water | 0.3 |

The malonic diamide-formaldehyde condensation product, sodium hydroxide solution and formaldehyde solution are mixed together and then the phenol is added immediately. The mass is refluxed for one hour and dehydrated to an internal resin temperature of 110° C. under 27" mercury vacuum, after which an equal volume of alcohol is added. Paper sheets are impregnated with the resin syrup to a 50% resin content, thereafter being dried in an oven at 70° C. for 35 minutes. The coated and impregnated laminated products are molded at 135° C. for 15 minutes under a pressure of 2000 pounds per square inch. The molded product is cooled for 5 minutes before removing from the mold. The molded product is a cured, translucent, almost pure white, laminated product.

*Example 14*

Same formula as in Example 13. The reactants are heated under reflux for 90 minutes. Fifty-eight parts water are removed and 0.53 part of citric acid hydrate is added. Paper sheets are dipped in the varnish, dried and molded under a pressure of 1600 pounds per square inch at 140° C. for 15 minutes. The varnish in this case is water-white and the molded product also is white.

*Example 15*

Same formula as in Example 13. The malonic diamide-formaldehyde condensation product, formaldehyde solution and sodium hydroxide solution are mixed and allowed to stand for one hour. The phenol is then added and the mass is refluxed for two hours, 100 parts water being removed. To the resulting mass is added 0.53 part citric acid hydrate, after which sheets of paper are dipped in the liquid resin. The coated and impregnated sheets are dried at 100° C. for 90 minutes. The laminated sheets are molded at 130° C. for 30 minutes, using a pressure of 1600 pounds per square inch.

*Example 16*

| | Parts |
|---|---|
| Malonic diamide-formaldehyde partial condensation product | 2.5 |
| Re-distilled, water-white phenol | 50 |
| Aqueous formaldehyde solution (approximately 37.1% HCHO) | 75 |
| Sodium hydroxide in 5 parts water | 0.15 |

The malonic diamide-formaldehyde condensation product, formaldehyde solution and sodium hydroxide solution are mixed and allowed to stand for one hour. The phenol is then added and the solution is refluxed for six hours until a white cloudiness is formed. To the resulting mass is added 0.26 part citric acid hydrate, after which the liquid resin is dehydrated until most of the water has been removed. Thirty-five parts ethyl alcohol are added. The resulting varnish is water-white. Sheets may be dipped in this varnish, dried, and thereafter superposed and molded as in the previous examples.

It is to be observed that very light-colored varnishes having good cures and which do not discolor perceptibly at higher temperatures are obtained. The products are much lighter in color than those obtained with ordinary alkaline catalysts.

It is found that the varnish is much more stable if the alkali added to the reaction mass is neutralized by the addition of at least the calculated amount of acid. Any substances of an acid nature are satisfactory, e. g., organic acids such as lactic, oxalic, acetic and the like may be used. The varnishes remain water-white. Either a shorter reflux time may be used when the components are reacted in a water medium or a longer reflux time may be used with an alcohol medium.

A characteristic of the products is that no sticking of the impregnated sheets is encountered in the mold. Moreover, prolonged exposure to sunlight, for example up to a period of nineteen days, produced practically no change in the color of the laminated sheets. Also, when the laminated products were immersed for 170 hours in water at room temperature while exposed to light, they showed no signs of delamination. Furthermore, they showed low water-absorption characteristics even without the addition of water-repellents.

The condensation products of this invention may be utilized instead of substances such as hexamethylene tetramine in the curing of a phenol-aldehyde resin. The amount of condensation product used determines the speed of cure as well as the color of the cured product. The amount of the condensation product may be varied and 35 to 50%, for example, of the weight of the total resinous composition may be used satisfactorily. The condensation product cures the phenolic resin to a very light color and the final product has better light resistance than phenolic resins cured in the ordinary manner with conversion agents such as hexamethylene tetramine.

As specific illustrations, the following examples are cited:

Example 17

| | Parts |
|---|---|
| Malonic diamide | 150 |
| Aqueous formaldehyde solution (approximately 37.1% HCHO) | 475.6 |
| Sodium hydroxide in 10 parts water | 1.5 |

The malonic diamide and formaldehyde solution are mixed and made neutral to litmus, after which the sodium hydroxide solution is added. The resulting mixture is heated under reflux for one hour, filtered, and dehydrated under 27" mercury vacuum to an internal resin temperature of 100° C., that is, until the resin no longer is tacky when cold. The resulting resin may be processed, for example by milling with a phenol-aldehyde resin in any manner well known in the art, or by using a specially prepared phenolic resin such as those illustrated below:

Resin A:

| | Parts |
|---|---|
| Phenol | 300 |
| Aqueous formaldehyde solution (approximately 37.1% HCHO) | 260 |
| Concentrated sulfuric acid in 60 parts water | 1.8 | are refluxed for one hour. The resin is washed with additional water until it is neutral to litmus and then dehydrated for 3 hours to an internal temperature of 110° C. under 27" mercury vacuum and further for 7 hours to 150° C. under vacuum.

Resin B:

| | Parts |
|---|---|
| Phenol | 300 |
| Aqueous formaldehyde solution (approximately 37.1% HCHO) | 258.5 |
| Concentrated sulfuric acid in 60 parts water | 1.8 | are refluxed for one hour. The resin is washed until neutral and then dehydrated for 7 hours to an internal resin temperature of 110° C. under 27" mercury vacuum.

Resin C:

Same formula as for Resin B with the exception that 5 parts calcium carbonate are added with stirring at the end of the one hour reflux period, and the resulting resin is dehydrated to an internal resin temperature of 110° C. under 27" mercury vacuum over a period of 7 hours.

Example 18

A molding resin may be prepared by mixing at 130°–150° C. 35 to 50 parts of the malonic diamide-formaldehyde resin of Example 17 with 50 to 65 parts of one or another of the phenolic resins identified under Example 17 as Resins A, B and C. The color of the molded product is light ivory if the resin is molded by itself. Fillers, such as wood flour, alpha cellulose and the like, lubricants, dyes, pigments, etc., may be incorporated with the resins to give thermosetting compositions of good water-resistance.

Example 19

| | Parts |
|---|---|
| Malonic diamide-formaldehyde resin of Example 17 | 7.5 |
| Alpha flock | 5.3 |
| Zinc stearate | 1.5 |
| Lithopone | 1.5 |

The whole may be ball milled, sheeted on rolls or processed in a Banbury mixer, ground and molded to a white product.

Example 20

| | Parts |
|---|---|
| Malonic diamide-formaldehyde resin of Example 17 | 10 |
| Alpha flock | 9 |
| Lithopone | 1 |
| Blue toner | 0.04 |

The above components are mixed and processed as in Example 19, yielding a stable, blue product.

Example 21

| | Parts |
|---|---|
| Malonic diamide-formaldehyde partial condensation product | 5 |
| Aqueous formaldehyde solution (approx. 37.1% HCHO) | 125 |
| Sodium hydroxide in 10 parts water | 0.3 |
| Phenol | 50 |

The malonic diamide-formaldehyde condensation product, aqueous formaldehyde solution and sodium hydroxide solution are mixed and allowed to stand for one hour. Thereafter the phenol is added and the mass is heated under reflux for from 1 to 4 hours. To the resulting liquid resin are added 50 to 70 parts alpha flock. The mixture is dehydrated and then molded under pressure at 150° C. This illustrates the utilization of a wet-mix process whereby products of further increased light-resistance may be produced.

In addition to the production of laminated products, molding (moldable) compositions and molded products, the resinous condensation products of this invention also may be utilized, for example, in conjunction with phenolic resins to produce casting resins and light-colored cast products. Generally the procedure for preparing the resins is the same as described above, the compositions being dehydrated under vacuum and cast in the usual way.

It will be understood, of course, by those skilled in the art that my invention is not limited to the specific reactants named in the above illustrative examples. Thus, instead of formaldehyde other compounds engendering formaldehyde may be employed, for example paraformaldehyde, hexamethylene tetramine, etc. Other aliphatic aldehydes also may be used, the particular aldehyde depending upon economic considerations and the particular properties desired in the end-product. For instance, in certain cases I may use propionaldehyde, butyraldehyde, methacrolein, crotonaldehyde, furfural, etc., mixtures thereof, or mixtures of formaldehyde or compounds engendering formaldehyde with such aliphatic aldehydes.

Likewise, substances other than phenol itself may comprise the methylol-forming organic compound. For instance I may use other reactive phenolic bodies such as ortho, meta and para cresols, ortho, meta and para chlorphenol, meta nitrophenol, p,p'-dihydroxy diphenyl propane, catechol, resorcinol, the xylenols, meta ethyl phenol, para tertiary butyl phenol, para tertiary amyl phenol, the ortho, meta and para phenyl phenols, the ortho, meta and para benzyl phenols, phenyl phenol ethane, etc., or mixtures of such aldehyde-reactable phenolic bodies.

The new intercondensation products of this invention in which the phenol is an ortho- or para-substituted phenol containing three or more carbon atoms in the substituent grouping are soluble in oils, as for example drying and semi-drying oils, and in such form, with or without further heat treatment of the oily solution of the resinous condensation product, may be used in the production of coating compositions such as varnishes, enamels, lacquers, etc. Examples of substituted phenols yielding oil-soluble intercondensation products are the ortho- and para- substituted butyl phenols, amyl phenols, coumar phenols, phenyl phenols, 2-ethyl hexyl phenols, terpene phenols, symmetrical phenyl phenol alkanes, the nuclearly phenylated phenyl phenol alkanes, etc.; or, in general, an ortho- or a para- substituted phenol having two reactive positions in the aromatic nucleus and containing at least three carbon atoms in the substituent grouping. The term "a phenol" as used generally herein and in the appended claims therefore is intended to include within its meaning not only phenol ($C_6H_5OH$) itself but also homologues and derivatives of phenol.

Likewise malonic compounds other than malonic diamide may be used separately, or mixed with each other or with malonic diamide. Illustrative examples of other malonic compounds which may be employed are methylene cyanide and compounds having the graphic formula

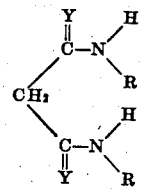

where Y represents a member of the class consisting of oxygen and sulfur and R represents a member of the class consisting of hydrogen; alkyl, aryl, aralkyl, alkaryl, acyl, naphthyl, hydrocyclic and heterocyclic radicals; and nitro, halogeno, aceto, carbalkoxy and acetoxy derivatives of such radicals. Illustrative examples of other malonic compounds which may be employed are compounds having the graphic formula

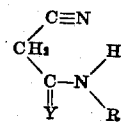

where Y and R have the meanings given in the preceding sentence. More specific examples of compounds coming within the scope of the above formulas are cyanoacetamide, monothio malonic diamide, dithio malonic diamide, cyanothio acetamide, N,N'-dialkyl (e. g., -dimethyl, -diethyl, -dipropyl, etc.) malonic diamides and dithioamides, N,N'-diphenyl, -ditolyl, -dibenzyl, -diphenethyl, -dicinnamyl, -di(para-hydroxy phenyl) and -di(para-amino phenyl) malonic diamides and dithioamides; and N-methyl, -ethyl, -propyl, -isobutyl, -phenyl, -tolyl, -benzyl, -phenethyl, -cinnamyl, -para-hydroxy phenyl, -para-amino phenyl, -acetoxy, -propionoxy, -butyroxy and -carbalkoxy cyanoacetamides and cyanothioacetamides.

It also will be understood not only that mixtures of malonic compounds may be used but likewise that mixtures of the other reactants may be employed in order to impart particular characteristics to the end-product. For example, as methylol-forming reactants I may use in certain cases mixtures of different phenols, mixtures of urea and urea derivatives (or substances of the nature of urea) or mixtures of urea derivatives and substances of the nature of urea, e. g., mixtures of urea and thiourea, thiourea and allyl urea, urea and melamine, thiourea and guanidine, etc., mixtures of a phenol and a urea or a urea derivative (or a substance of the nature of urea), mixtures of amines, mixtures of an amine and a phenol, mixtures of an amine and a urea, etc. The plurality of methylol-forming bodies may be intercondensed with a single aliphatic aldehyde or with a plurality of aliphatic aldehydes, using either a single malonic compound or a plurality of malonic compounds. Also, of course, a single methylol-forming body may be intercondensed with one or more aliphatic aldehydes and one or more malonic compounds.

Additional examples of urea derivatives and substances of the nature of urea which may constitute the methylol-forming compound used as a modifying reactant are given in my aforementioned copending application Serial No. 330,555. Other examples of methylol-forming bodies that may be used alone or mixed with one another or mixed with a urea, a phenol or other methylol-forming compound are monohydric alcohols such as ethyl, propyl, isopropyl, butyl, amyl, etc., alcohols; polyhydric alcohols, e. g., ethylene glycol, diethylene glycol, glycerol, pentaerythritol, trimethylol nitromethane, etc.; monoamides such as formamide, acetamide, stearamide, acrylic acid amides (acryloamides), benzamide, toluene sulfonamide, etc.; polyamides such as adipic diamide, phthalamide and the like; amines such as ethylene diamine, aniline, phenylene diamine, amino phenols, etc.

If desired, the fundamental resinous condensation products of this invention may be modified by introducing other bodies before, during or after condensation between the primary components. These addition agents may take the form of high molecular weight bodies with or without resinous characteristics, for example partially hydrolyzed wood products, lignin, proteins, protein-aldehyde condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc.; polyvinyl compounds such as polyvinyl alcohol, polyvinyl acetate, polyvinyl acetals, specifically polyvinyl formal, synthetic linear condensation products such as the superpolyamides, etc.

When compositions of increased plastic flow are desired, substances of a plasticizing nature may be incorporated into the synthetic bodies of this invention before, during or after condensation between the reactants. Examples of suitable plasticizers which may be used when necessary are the phthalate esters, for instance dimethyl phthalate, diethyl phthalate, dibutyl phthalate, etc., the phosphate esters such as tricresyl phosphate, triphenyl phosphate, etc.

Dyes, pigments and opacifiers (e. g., barium sulfate, zinc sulfide, titanium compounds such as the oxides, flaked aluminum, copper and the like) may be incorporated into the compositions to alter the visual appearance and the optical properties of the finished product. Mold lubricants such as the metallic soaps of the high molecular weight fatty acids, for example the stearates and palmitates of tin, zinc, cadmium, etc., waxes such as carnauba, high melting point paraffin waxes, etc., may be added to facilitate molding of the compositions. Various fillers may be used to provide a wide variety of molding compositions. The choice of the filler depends upon the particular application for which the molded article is to be employed. As fillers may be used, for instance, bleached or unbleached wood flour, alpha cellulose in flock form, sheets or cuttings of paper, cloth, canvas, etc., asbestos in powdered or long or short fiber length, powdered or flaked mica, wood chips, short or long wood fibers, synthetic or natural continuous threaded fibers, glass fibers in continuous filament or fabric (woven or felted) form, etc.

In preparing molding compositions from the resinous bodies of this invention, the non-dehydrated or the partially dehydrated resins may be compounded with the above addition agents in accordance with procedures well-known to those skilled in the art. The molding compositions may be molded or extruded at elevated temperatures, e. g., between 100° and 170° C., usually between 120° and 150° C., and at suitable pressures. The molding pressures generally range between about 1000 and about 10,000 or 20,000 pounds per square inch, more particularly from about 2000 to about 4000 or 5000 pounds per square inch in the case of compression molding.

In addition to their use in molding compositions, the condensation products of this invention are especially suitable for use as fire retardants, water repellents and sizings when applied to wood or the like, or to fibrous materials such as silk, cotton, wool, synthetic organic fibers, etc., in continuous filament, thread, fabric or other form. It will be understood, of course, that optimum resistance to water, fire, solvents, etc., is obtained only when the applied coating or sizing is converted to the insoluble and infusible (cured) state.

The modified or unmodified products of this invention have a wide variety of other uses, for instance in making interior finishing materials for homes, offices, etc., in making buttons, clock cases, radio cabinets, dishes and other household utensils, decorative novelties and various other cast, molded and laminated articles of manufacture. They also may be used in making paints, varnishes, lacquers, enamels and other protective surfacing materials, in the manufacture of arc-extinguishing tubes capable of evolving an arc-extinguishing gas under the heat of the arc, in the production of wire or baking enamels, for general adhesive applications, for instance in bonding or cementing together mica flakes to form a laminated mica article, as impregnants for electrical coils and other electrical devices, and for other purposes.

Compositions comprising a condensation product wherein a urea constitutes an essential reactant in addition to an aldehyde and the above-described methylene compound are disclosed and claimed in my copending application Serial No. 330,555. In my copending application Serial No. 169,465 I disclosed and specifically claimed compositions comprising the product of reaction of a mixture comprising (that is, of ingredients comprising) an aliphatic aldehyde and malonic diamide.

What I claim as new and desire to secure by Letters Patent of the United States is:

1. A composition comprising a condensation product of a mixture comprising an aliphatic aldehyde and at least one organic compound having the graphic structure

where X is a member of the class consisting of nitrile radicals, and amide and thioamide radicals having at least one hydrogen atom attached directly to the amide nitrogen.

2. A composition as in claim 1 wherein the aliphatic aldehyde reactant is formaldehyde.

3. A resinous composition comprising the product of reaction of a mixture comprising an aliphatic aldehyde and at least one organic compound having the graphic structure

where X is a nitrile radical.

4. A resinous composition comprising the product of reaction of a mixture comprising an aliphatic aldehyde and at least one organic compound having the graphic structure

where X is an amide radical having at least one hydrogen atom attached directly to the amide nitrogen.

5. A resinous composition comprising the product of reaction of a mixture comprising an aliphatic aldehyde and at least one organic compound having the graphic structure

where one X is a nitrile radical and the other X is an amide radical having at least one hydrogen atom attached directly to the amide nitrogen.

6. A composition comprising an alkaline-catalyzed resinous condensation product of a mixture comprising an aliphatic aldehyde and at least one organic compound having the graphic structure

where X is a member of the class consisting of nitrile radicals, and amide and thioamide radicals having at least one hydrogen atom attached directly to the amide nitrogen.

7. A composition comprising an alcohol-modified resinous condensation product of a mixture comprising an aliphatic aldehyde and at least one organic compound having the graphic structure

where X is a member of the class consisting of nitrile radicals, and amide and thioamide radicals having at least one hydrogen atom attached directly to the amide nitrogen.

8. A composition comprising a condensation product of a mixture comprising an aliphatic aldehyde, a phenol and an organic compound having the graphic structure

where X is a member of the class consisting of nitrile radicals, and amide and thioamide radicals having at least one hydrogen atom attached directly to the amide nitrogen.

9. A resinous composition comprising the product of reaction of a mixture comprising formaldehyde, a phenol and an organic compound having the graphic structure

where X is a member of the class consisting of nitrile radicals, and amide and thioamide radicals having at least one hydrogen atom attached directly to the amide nitrogen.

10. An oil-soluble resinous composition comprising the product of reaction of a mixture comprising (1) an aliphatic aldehyde, (2) an ortho-substituted phenol having at least two reactive positions in the aromatic nucleus and containing at least three carbon atoms in the substituent grouping and (3) at least one organic compound having the graphic structure

where X is a member of the class consisting of nitrile radicals, and amide and thioamide radicals having at least one hydrogen atom attached directly to the amide nitrogen.

11. An oil-soluble resinous composition comprising the product of reaction of a mixture comprising (1) an aliphatic aldehyde, (2) a para-substituted phenol having at least two reactive positions in the aromatic nucleus and containing at least three carbon atoms in the substituent grouping and (3) at least one organic compound having the graphic structure

where X is a member of the class consisting of nitrile radicals, and amide and thioamide radicals having at least one hydrogen atom attached directly to the amide nitrogen.

12. A resinous composition comprising the product of reaction of methylene cyanide and formaldehyde.

13. A resinous composition comprising the product of reaction of cyanoacetamide and formaldehyde.

14. A resinous composition comprising the product of reaction of a mixture comprising formaldehyde, malonic diamide and a phenol.

15. A light-colored resinous composition comprising the product of reaction of phenol-aldehyde condensation product and the product of reaction of a mixture comprising an aliphatic aldehyde and at least one organic compound having the graphic structure

where X is a member of the class consisting of nitrile radicals, and amide and thioamide radicals having at least one hydrogen atom attached directly to the amide nitrogen.

16. A heat-convertible resinous composition comprising a soluble, fusible resinous reaction product of a mixture comprising formaldehyde and at least one organic compound having the graphic structure

where X is a member of the class consisting of nitrile radicals, and amide and thioamide radicals having at least one hydrogen atom attached directly to the amide nitrogen.

17. A product comprising the cured resinous composition of claim 16.

18. A light-colored molded article comprising a cellulosic filler and an insoluble, infusible resinous condensation product of malonic diamide, phenol and formaldehyde.

19. A light-colored molded article produced by molding under heat and pressure a composition comprising the product of reaction of phenol-aldehyde condensation product and the product of reaction of a mixture comprising an aliphatic aldehyde and at least one organic compound having the graphic structure

where X is a member of the class consisting of nitrile radicals, and amide and thioamide radicals having at least one hydrogen atom attached directly to the amide nitrogen.

20. The method of producing a resinous composition especially adapted for use as a molding composition, a casting resin or a varnish, said method comprising reacting to resin formation a mixture comprising an aliphatic aldehyde and at least one organic compound having the graphic structure

where X is a member of the class consisting of nitrile radicals, and amide and thioamide radicals having at least one hydrogen atom attached directly to the amide nitrogen.

GAETANO F. D'ALELIO.